United States Patent [19]

Howes

[11] Patent Number: 4,469,277

[45] Date of Patent: Sep. 4, 1984

[54] BACK-UP GUIDE FOR TRUCKS OR TRAILERS

[76] Inventor: Don E. Howes, 6095 W. Saanich Rd., Victoria, B.C., Canada

[21] Appl. No.: 495,022

[22] Filed: May 16, 1983

[30] Foreign Application Priority Data

Apr. 14, 1983 [CA] Canada .................................. 425903

[51] Int. Cl.³ .......................................... E01B 23/00
[52] U.S. Cl. .................... 238/10 R; 280/761; 180/313; 188/32; 414/401; 238/3; 238/1
[58] Field of Search .......................... 238/10 R, 1, 3, 4; 280/761; 180/313; 188/32, 36; 414/401, 396, 584; 104/254

[56] References Cited

U.S. PATENT DOCUMENTS

| | | | |
|---|---|---|---|
| 1,634,835 | 7/1927 | Lampert | 238/10 R |
| 2,846,088 | 8/1958 | Porter | 188/32 |
| 3,305,049 | 2/1967 | Willey | 188/32 |
| 3,549,027 | 12/1970 | Batson | 414/401 X |
| 3,734,214 | 5/1973 | Hale | 188/32 |
| 4,207,019 | 6/1980 | Cone | 414/373 |

FOREIGN PATENT DOCUMENTS 481831  4/1901 Canada .
508136  6/1953 Canada .
577219  3/1956 Canada .

Primary Examiner—Robert B. Reeves
Assistant Examiner—Gregory A. Beehner
Attorney, Agent, or Firm—Beveridge, DeGrandi & Kline

[57] ABSTRACT

A back-up guide for trucks or trailers is made of two elongated members attached perpendicularly to each other, with spikes on their underside to hold the device in a stationary position. The longer of the two members provides a guide for the side of a vehicle's rear wheel during backing up, and the other, shorter, member is laterally disposed and provides a wheel chock or stop member for the rear wheel, and also acts as a visual stop point for the driver. The lateral member has a rearward extension near each of its ends, which provides supports for wheels which allow easy movement of the device when the front end is raised to lift the spikes clear of the ground. Both members may be equipped with handles for ease of handling. The device may be transported by attachment to the side and back of a truck or trailer, resting on special brackets attached to the truck or trailer.

10 Claims, 5 Drawing Figures

BACK-UP GUIDE FOR TRUCKS OR TRAILERS

BACKGROUND OF THE INVENTION

This invention relates to a back-up guide for locating the rear of a vehicle such as a truck or trailer and especially the rear of a dump truck which is required to dump at a particular place. The device may be used for example for guiding s grain truck so that it can properly deliver its grain to the pan of a grain auger.

PRIOR ART

Presently, it is known to use permanently mounted barriers, in some situations, for locating the rear end of a truck for example at a loading bay. Also, there are known wheel chock devices which are portable and which may have spikes for engaging the ground. However, the portable wheel chocks are only effective to position a vehicle in the longitudinal direction.

SUMMARY OF THE INVENTION

The present invention provides a back-up guide for trucks or trailers which can locate the rear end of the vehicle both longitudinally and laterally. When the device is operational it is effectively fixed in position, but it can easily be moved to adjust the position of dumping. Also, the device is adapted so that it can easily be transported by a truck or trailer having a few simple brackets provided for the purpose.

A back-up guide in accordance with the invention comprises an elongated guide member suitable for guiding the side of a truck or trailer wheel, to provide lateral positioning of the vehicle, and a wheel stop member fixed at about a right angle to a rear end portion of the guide member. The guide member and stop member are arranged in open L-shaped configuration so that the device is readily transportable by truck or trailer with the guide member extending along a portion of the side of a truck or trailer body which is longer than the guide member and with the stop member lying along the end of the truck or trailer body. One or both of said members have means such as spikes for gripping the ground and preventing sliding when the guide is being used. The guide is provided with wheel means or the like at one end which afford relatively easy movement of the guide when its other end is raised until the spikes or like gripping means are clear of the ground.

The wheel means or the like (for example skids) are preferably mounted on support means which extend rearwardly from the stop member, the support means being arranged so that the wheel means or the like are preferably just clear of a flat ground surface when the members are laid flat on that surface. The wheel means of course engage the ground when the front end of the guide member is lifted, to allow easy movement. One or both of the members preferably have handles to allow easy manipulation, both for adjusting the position on the ground and for placing the guide on a truck for transportation.

BRIEF DESCRIPTION OF THE DRAWINGS

The invention will further be described with reference to the accompanying drawings, in which.

DETAILED DESCRIPTION

The back-up guide shown comprises a long, elongated guide member 10 the rear end of which is attached at a right angle to one of the sides of a shorter, lateral member 12 which forms a wheel stop member. Both members 10 and 12 are formed of square section steel tubing about 3 inches (76 mm) in width, this dimension being sufficient that when used with reasonable care the wheels of a truck will not easily ride over the members. Dimensions may vary depending on the size of vehicle for which the device is to be used. The longer member 10 is slightly shorter than the length of the body of a grain truck. The lateral member 12 is dimensioned so that on one side of the axis of member 10 it extends about to the centre line of the truck when the left side rear wheel of the truck is in contact with member 10; this allows the device to be aligned or centered in relation to the dumping point. The lateral member also extends a short distance on the other side of member 10 to provide a visual stooping point for the vehicle driver; a forward facing reflector may be provided near this end of the lateral member so that it is more easily seen.

Figure 1:
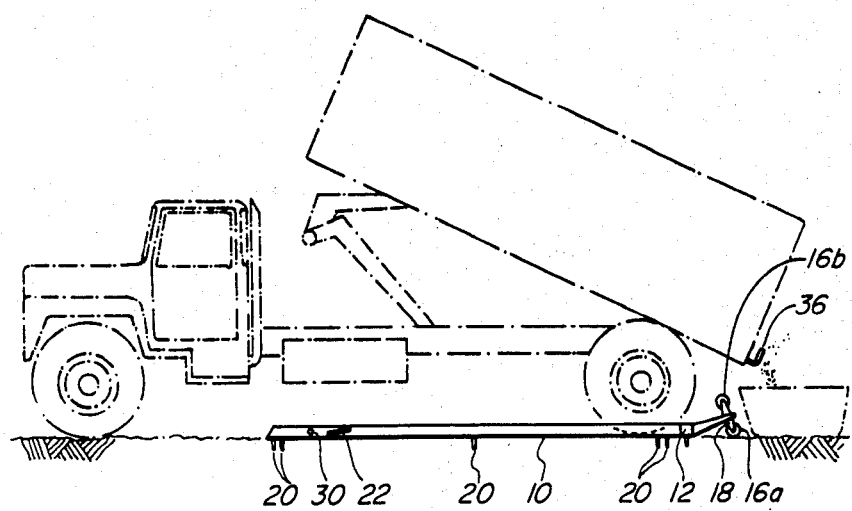
FIG. 1 is an elevational view of the back-up guide, shown in operative position relative to a dump truck delivering grain into the pan of a grain auger, both truck and pan being shown in broken lines.
Figure 2:
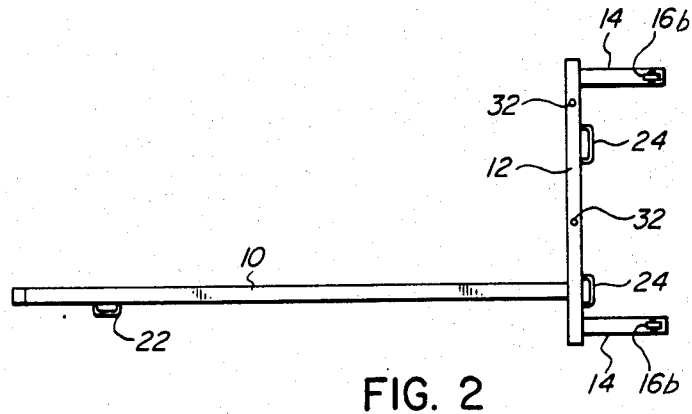
FIG. 2 is a top plan view of the back-up guide.
Figure 3:
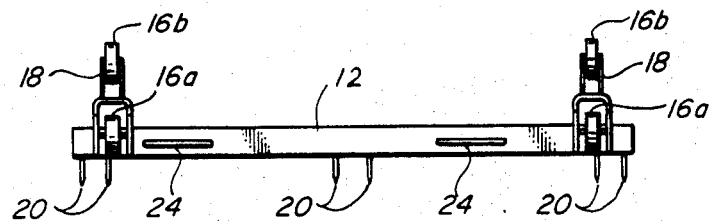
FIG. 3 is an end view of the device taken in the direction of the lines 3—3 of FIG. 2.

Extending rearwards from the lateral member 12 are two supports 14, each connected to member 12 near to one of its ends. As seen in FIG. 2, one of the supports 14 is close to but outside of the point of connection between the member 10 and member 12, so that in effect the supports 14 are positioned on both sides of the axis of member 10. In the operational position shown in FIG. 1 the supports extend upwardly from the rear face of member 12 at an angle of say 20°.

The outer ends of each of the supports 14 carries two small wheels 16a and 16b mounted in brackets 18, the wheels and brackets being symmetrically arranged on the top and bottom of each of the supports 14. The dimensioning of the parts is such that the lower wheels 16a are just in contact with or slightly above ground level when the members 10 and 12 are laid on the ground as shown.

The device further includes a series of ground penetrating spikes 20 situated at the forward and rear ends and at the center of member 10, and also at both ends and the center of member 12, these gripping the ground so that the device does not move when struck by the wheels of a truck. The spikes may be perpendicular to the lower surfaces of the members or may be rearwardly raked at say 20°. Additionally, member 10 has a forward handle 22 on its outer side, and member 12 has two handles 24 on its rearmost side.

The forward handle 22 is angled so as to be horizontal when the front end of member 10 is lifted. The arrangement of handles and spikes is such that although the device firmly grips the ground in its operational position, when the front end is raised by handle 22 the lower wheels 16a come into contact with the ground, and once the spikes are free of the ground the device can easily be moved around by manipulating the end of member 10.

Figure 4:
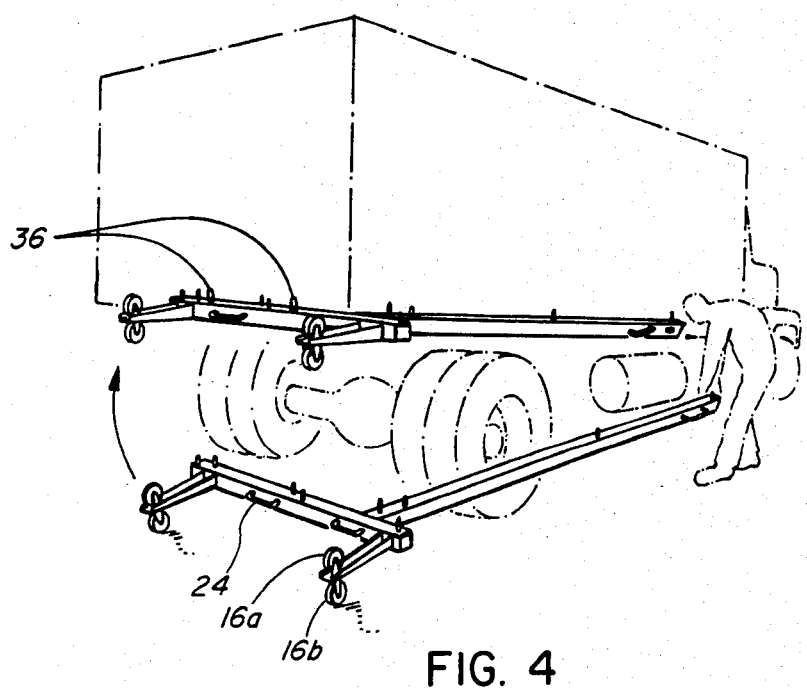
FIG. 4 is a perspective view of the device positioned for being carried by a vehicle.
Figure 5:
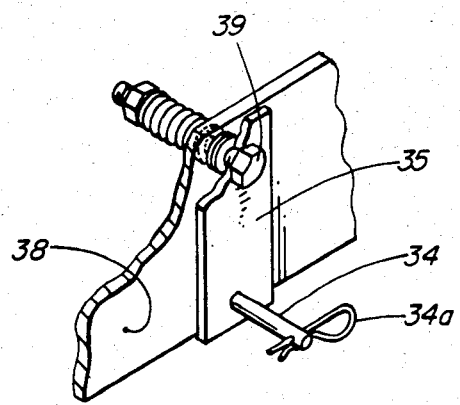
FIG. 5 is a fragmentary view of a swivel link on the side of the truck suitable for receiving the guide.

The device also has means for engagement by brackets carried by a truck, such means including a horizontal bore 30 near the front end of member 10 and two vertical bores 32 spaced apart along member 12. For transportation purposes, the bore 30 receives a pin 34 held by a swivel link 35, shown in FIG. 5, and the vertical bores 32 engage the vertical portions of rear brackets 36 shown in FIGS. 1 and 4. The swivel link 35 shown in FIG. 5 is a metal plate which is held close to the side of chassis member 38 by a spring loaded bolt 39. Pin 34 has an aperture for retaining clip 34a, and similar chips are used to hold member 12 onto brackets 36.

When it is desired to transport the device, it is firstly lifted by the handle 22 and moved around to the passenger side of the truck, after which it is inverted so that the upper wheels 16b contact the ground. This is the position shown in FIG. 4. Then, the retaining clip 34a is removed from pin 34 and the member 10 is manipulated so that pin 34 can be inserted in bore 30 of the member 10, and secured in place by the clip 34a. Then the rear end of the guide is lifted by means of handles 24, the device being simultaneously pulled rearwardly as allowed for by the swivelling link 35 so that it clears the brackets 36, and after having been lifted above these brackets it is located with the bores 32 engaging the vertical portions of these brackets and the retaining clips are fitted. The reverse procedure of course is used for unloading and positioning the device for use.

I claim:

1. An easily transportable back-up guide for locating the rear end of a truck or trailer both longitudinally and laterally, comprising an elongated guide member suitable for guiding the side of a wheel and a wheel stop member fixed at about a right angle to a rear end portion of the guide member, said guide member and stop member being arranged in open L-shaped configuration so that the guide is mountable on a truck or trailer body with the guide member extending along a portion of the side of said body which body is longer than the guide member and with the stop member adjacent an end of said body, at least one of said members having means for gripping the ground and preventing sliding when the guide is in use, said guide being provided with wheel means or the like at one end thereof which afford relatively easy movement of the guide when the other end is raised so that said gripping means clear the ground.

2. A back-up guide according to claim 1 wherein said wheel means or the like are mounted on support means which extend rearwardly from the stop member, said support means being arranged so that the wheel means or the like are clear of a flat ground surface when said members are laid down on the surface.

3. A back-up guide according to claim 2, wherein said gripping means are spikes provided on both of said members.

4. A back-up guide according to claim 1, wherein said gripping means are spikes provided on both of said members.

5. A back-up guide according to claim 1 wherein at least one of said members has, handle means for its manipulation.

6. A back-up guide according to claim 1 wherein at least one of said members has an aperture for receiving holding elements of said truck or trailer body.

7. An easily transportable back-up guide for locating the rear end of a truck or trailer both longitudinally and laterally, comprising an elongated guide member suitable for guiding the side of a wheel and a wheel stop member fixed at about a right angle to a rear end portion of the guide member, said guide member and stop member being arranged in open L-shaped configuration so that the guide is mountable on a truck or trailer body with the guide member extending along a portion of the side of said body which body is longer than the guide member and with the stop member adjacent an end of said body, at least one of said members having means for gripping the ground and preventing sliding when the guide is in use, and having spaced supports extending rearwardly from the stop member and each provided with wheel means which are clear of a flat ground surface engaged by said gripping means, whereby when a forward end of the guide member is raised said wheels come into contact with the ground and so raise the gripping means clear of contact with the ground.

8. A back-up guide according to claim 7, wherein said supports are positioned on each side of the axis of the said guide member.

9. A back-up guide according to claim 7, wherein said gripping means are spikes provided on both of said members.

10. A back-up guide for locating the rear end of a truck or trailer both longitudinally and laterally, comprising an elongated guide member suitable for guiding the side of a wheel and a wheel stop member fixed at about a right angle to a rear end portion of the guide member, at least one of said members having means for gripping the ground and preventing sliding when the guide is in use, and having spaced supports extending rearwardly from the stop member and each provided with wheel means which are clear of a flat ground surface engaged by said gripping means, whereby when a forward end of the guide member is raised said wheels come into contact with the ground and so raise the gripping means clear of contact with the ground, and wherein said wheel means are provided both above and below the plane of said support means to allow the guide to be moved on said wheels both when the front end of said guide member is raised, and when the guide member has been inverted.

* * * * *